United States Patent [19]
Niki

[11] Patent Number: 5,335,294
[45] Date of Patent: Aug. 2, 1994

[54] IMAGE PROCESSING FOR PATTERN EXTRACTION

[75] Inventor: Toru Niki, Yokohama, Japan

[73] Assignee: Canon Kabushiki Kaisha, Tokyo, Japan

[21] Appl. No.: 915,306

[22] Filed: Jul. 20, 1992

[30] Foreign Application Priority Data

Jul. 23, 1991 [JP] Japan .................................. 3-182505

[51] Int. Cl.⁵ ............................................. G06K 9/48
[52] U.S. Cl. ...................................... 382/22; 382/25; 382/60
[58] Field of Search ..................... 382/22, 25, 48, 4, 60

[56] References Cited

U.S. PATENT DOCUMENTS

| | | | |
|---|---|---|---|
| 4,183,013 | 1/1980 | Agrawala et al. | 382/22 |
| 4,189,711 | 2/1980 | Frank | 382/22 |
| 4,630,306 | 12/1986 | West et al. | 382/22 |
| 4,791,676 | 12/1988 | Flickner et al. | 382/22 |
| 4,843,569 | 6/1989 | Sawada et al. | 382/24 |
| 5,182,777 | 1/1993 | Nakayama et al. | 382/24 |

*Primary Examiner*—Joseph Mancuso
*Attorney, Agent, or Firm*—Fitzpatrick, Cella, Harper & Scinto

[57] ABSTRACT

There are provided an image processing method and apparatus which can correctly extract desired image information from input image information and can recognize the extracted partial image information. An outline of a character or the like is traced by using an arbitrary point in the input image information as a start point. The start point is moved when the outline reaches the edge of the input image. The outline is again traced from the moved start point. The outline tracing and the movement of the start point are repeated until the character can be extracted by the outline tracing. When the number of times the start point has been moved exceeds a predetermined value, the input image information is inverted.

30 Claims, 8 Drawing Sheets

IMAGE PROCESSING FOR PATTERN EXTRACTION

BACKGROUND OF THE INVENTION

1. Field of the Invention

The invention relates to image processing method and apparatus which can correctly extract desired information from input image information and can recognize the extracted partial information.

2. Related Background Art

Figure 12:
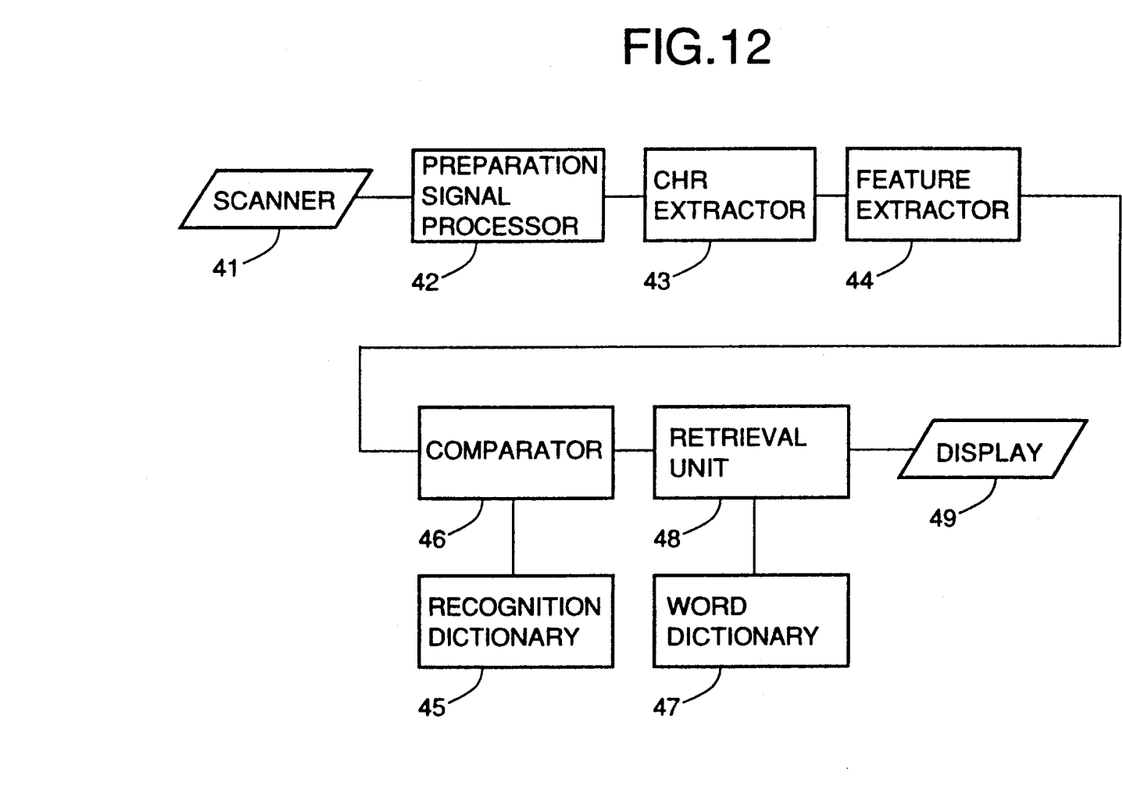
FIG. 12 shows an example of a construction of a conventional electronic dictionary of the recognizing type.

A conventional apparatus which can recognize characters from image information is constructed as shown in FIG. 12. Reference numeral 41 denotes a scanner for converting a character image on an object to be read into an analog electric signal; 42 a preparation signal processor to binarize the analog signal and to eliminate noise from the signal; 43 a character extractor to separate a character train into individual characters; 44 a feature extractor for extracting a feature which is peculiar to the particular character being examined and for producing a feature vector in accordance with a predetermined algorithm; 45 a recognition dictionary to store statistics (mean value, distribution, and the like) pertaining to each character type of the feature vector; 46 a comparator for comparing the feature vector obtained from the input character image and the recognition dictionary, thereby selecting the optimum candidate; 47 a word dictionary to store the results of translations of words; 48 a dictionary retrieval unit to extract the corresponding translated word from the recognized character train with reference to the word dictionary; and 49 a display to display the translated word.

The above conventional technique, however, has the following two drawbacks.

Figure 7:
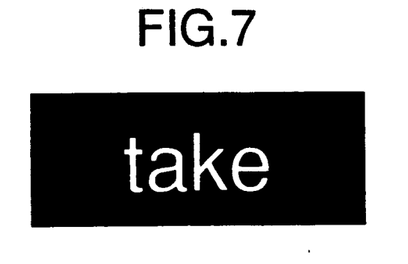
FIG. 7 shows an example of blank characters.
Figure 10:
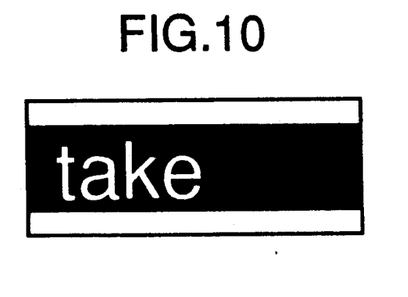
FIG. 10 shows an example of blank characters.

(1) What are called blank characters, which are written in white on a black background, cannot be recognized. FIGS. 7 and 10 show examples of such blank characters.

Figure 9:
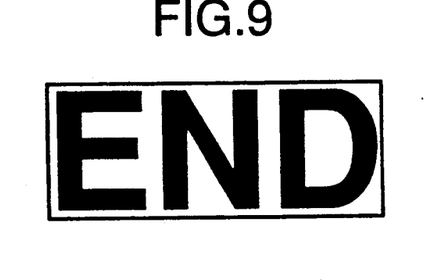
FIG. 9 shows an example of ordinary characters (bold characters)

As a conventional technique, there is known a method whereby a ratio of the number of black pixels in the whole image buffer is counted, and when the ratio is equal to or larger than a predetermined value, the characters are determined to be blank characters, those blank characters are inverted from white to black, and, thereafter, a recognizing process is executed. Such a method, however, has a drawback in that it takes a long time to count the number of black pixels, and consequently the whole processing time increases. As shown in an example of FIG. 9, on the other hand, there are cases where, when character lines are very thick, those characters are erroneously identified as blank characters. Or, as shown in FIG. 10, there are cases where, in spite of the fact that the characters are really blank characters, they cannot be so identified because there are a large number of white pixels. There is, consequently, a drawback in that it is not always possible to judge correctly whether given characters are blank characters.

Figure 11:
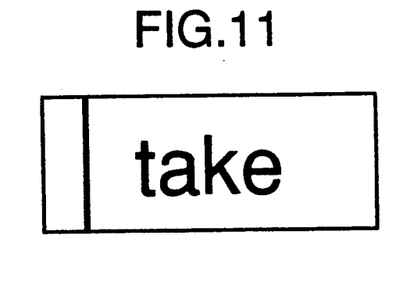
FIG. 11 shows an example of ordinary characters in an image also including a ruled line.

(2) As shown in FIG. 11, when a ruled line exists before a character train to be recognized, the characters of the train (here, the word "take") cannot be extracted.

Hitherto, when the operator tries to extract character information by tracing an outline of the character information by using a certain point of an input image as a start point, so long as a ruled line exists as shown in FIG. 11, the tracing starts from the start point and reaches the edge of the input image, and the tracing ends at such an edge. Therefore, the outline tracing operation doesn't reach the character train "take" and "take" cannot be extracted.

SUMMARY OF THE INVENTION

It is an aspect of the invention that when desired image information is extracted from input image information by tracing an outline, in the case where the outline tracing point reaches the edge of the input image, the start point of the outline tracing operation is moved and the outline tracing operation is again executed, thereby making it possible also to perform an extraction of desired image information from an image in which a delimiter image such as a ruled line or the like exists between the original start point of the outline tracing operation and the desired image.

Another aspect of the invention is that the shifting of the above start point and the outline tracing operation are repetitively executed, and when the number of shifting of the start point or the amount of a shift thereof exceeds an arbitrary value (some number of times or length), the input image is determined to be blank characters, and is inverted from white to black, and thereafter, desired image information is again extracted, thereby making it possible also to execute extraction of the blank characters from the image.

To solve the above problems, it is an aspect of the invention to provide an image processing method whereby an outline of character information is traced by using a certain point of input image information as a start point and, when the outline reaches an edge of the input image, the start point is moved, and the outline is again traced from the moved start point.

To solve the above problems, according to one preferred aspect of the invention both of a tracing of the outline and the movement of the start point are repeated until the character information can be extracted by the outline tracing operation.

To solve the above problems, according to another preferred aspect of the invention, when the outline tracing operation and the movement of the start point are repeated, the number of movements of the start point is counted, and when the count value exceeds a predetermined value, the image information is inverted.

To solve the above problems, according to still another preferred aspect of the invention, both the outline tracing operation and the movement of the start point are repeated until the character information can be extracted by the outline tracing operation.

DETAILED DESCRIPTION OF THE PREFERRED EMBODIMENTS

Figure 1:
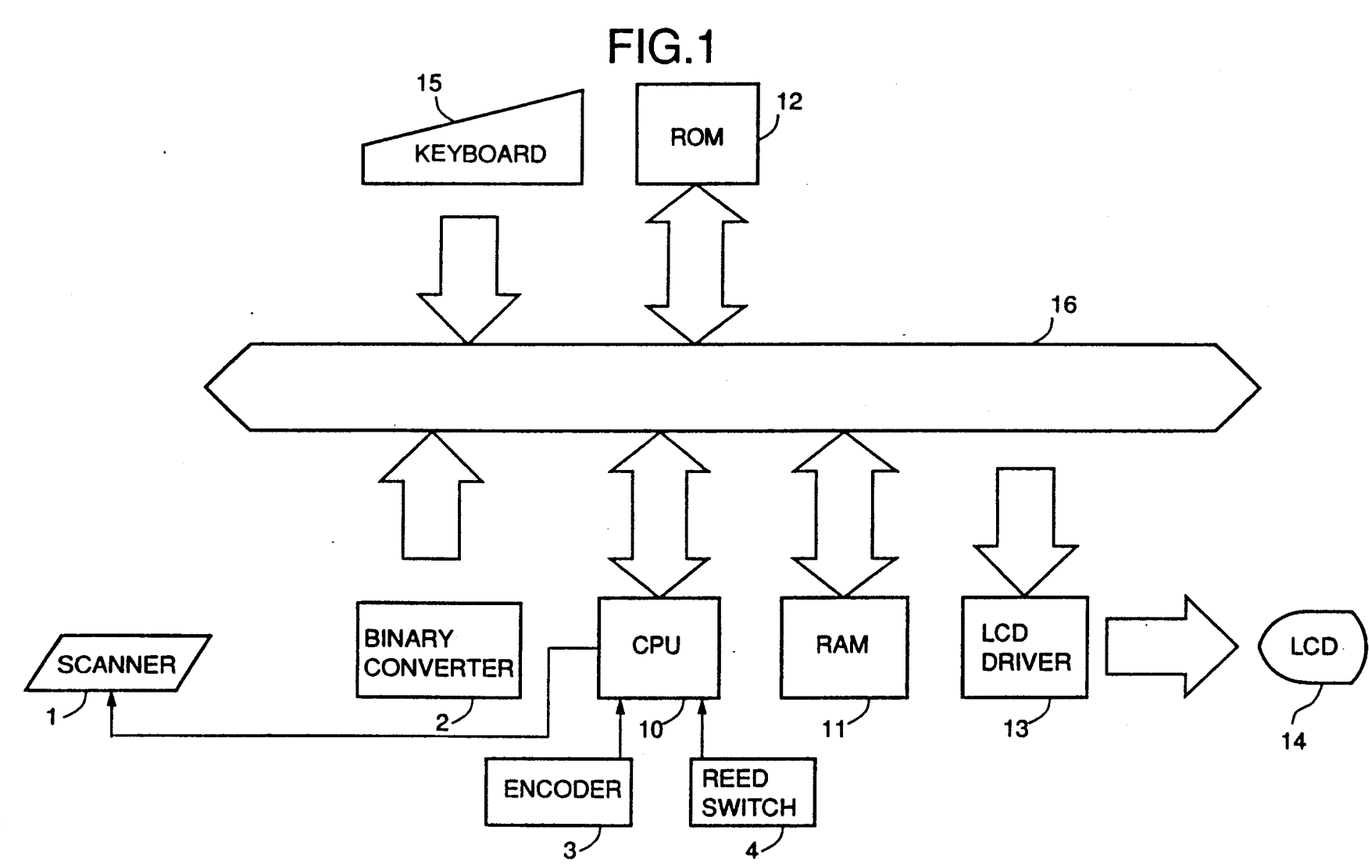
FIG. 1 is a block diagram showing an embodiment of the invention.

FIG. 1 is a block diagram showing an embodiment according to the invention and shows a construction of an electronic dictionary of the recognizing type in which a document on which an English word has been printed is read by a manual reading operation, characters are recognized and a Japanese translation of a word is displayed by searching a dictionary by using the result of the character recognition.

In the diagram, reference numeral 1 denotes a scanner to convert image information of an object to be read into an analog signal; 2 a binary converter to convert the analog signal generated from the scanner 1 into the binary digital signal; 3 an encoder which is synchronously rotated when the object is read by a manual scan and which generates a signal synchronized with the manual scan by detecting the rotation of the encoder by a photo interrupter; 4 a reed switch for monitoring a depressing state of a roller (i.e., whether the roller is depressed or not) to impart rotation to the encoder and for detecting the end of the reading operation; and 10 a central processing unit (CPU) comprising a large scale integrated circuit (LSI) including an interruption input port, an interruption control circuit, clock pulse generator, an instruction decoder, registers, an ALU, an input port, an output port, and an image input shift register. Reference numeral 11 denotes a random access memory (RAM) having a readable and writable memory section which is assigned to every address. As functions of the memory section, there can be mentioned a memory function to store data, a flag function to store the result of the discrimination process described below, a counting function to store a state by a count value, a register function for temporary storage, and the like. Reference numeral 12 denotes a read only memory (ROM) in which microprograms which are sequentially executed by the CPU 10, a recognition dictionary, an English-/Japanese dictionary, and constants which are used in various kinds of discriminations or the like, have been encoded and stored. Reference numeral 13 denotes a liquid crystal display driver (LCD driver) for receiving output data and generating a signal to display on a liquid crystal display (LCD) 14; 15 a keyboard; and 16 an external bus line including an external address bus and an external data bus. The addressing of the ROM and RAM, the transmission and reception of data, and the like are executed through the external bus line 16.

Figure 2A:
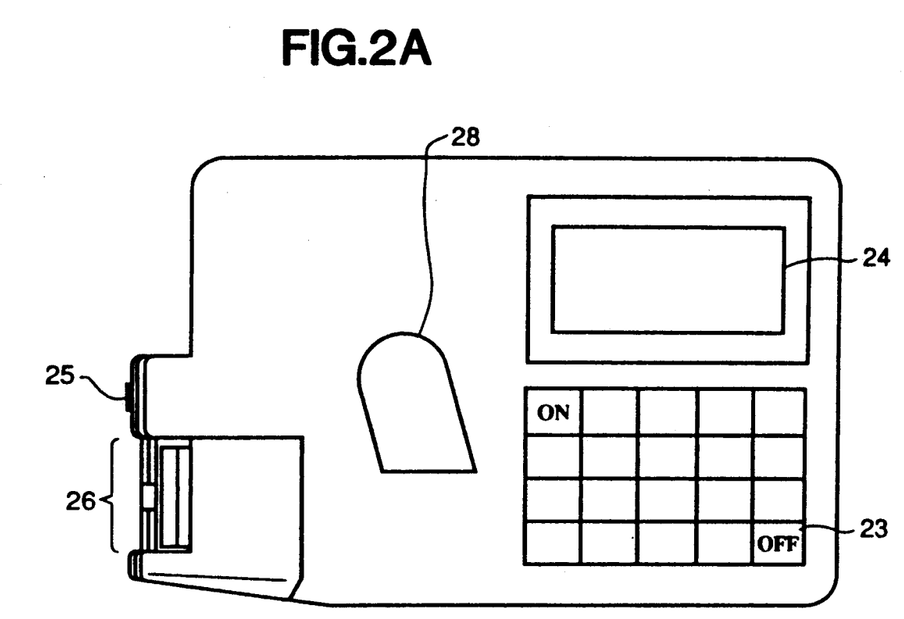
FIGS. 2A, 2B and 2C are external views of an apparatus of the embodiment of FIG. 1.
Figure 2B:
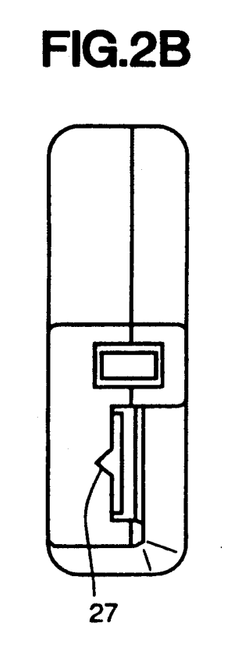
Figure 2C:
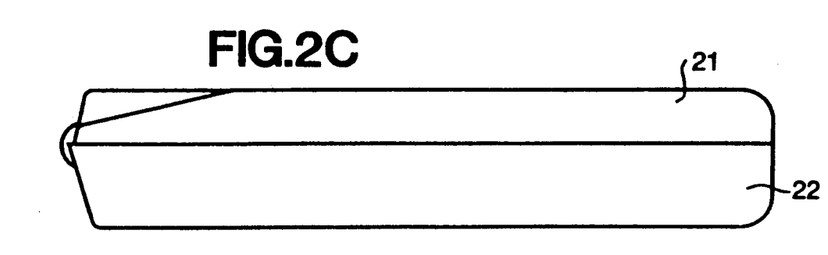

FIGS. 2A, 2B and 2C are diagrams showing external views of an apparatus of the embodiment of FIG. 1. Reference numeral 21 denotes an upper casing; 22 a lower casing; 23 an array of input keys; 24 a liquid crystal display; 25 a roller to impart rotation to the encoder; 26 a reading unit; 27 a mark for reading; and 28 a cavity for a thumb to facilitate holding the apparatus.

Figure 3:
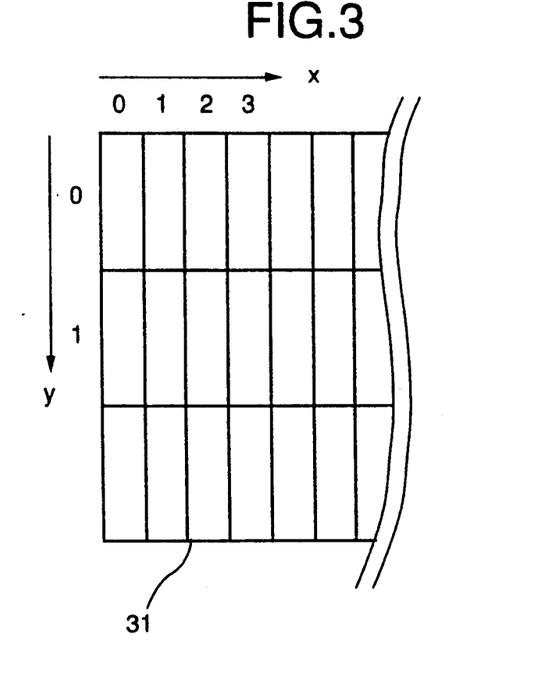
FIG. 3 is a diagram showing a storing method used in an image buffer.

First, image buffers which are provided in the RAM 11 will be described with reference to FIG. 3. A scanner used in the embodiment is a one-dimensional line sensor and reads image data line by line. The invention can be also applied to a line sensor which can read image data several lines at a time. Reference numeral 31 indicates image buffers which are provided in the RAM 11; the x direction is called a column, and the y direction is called a row. The image data of one line which has been read is sequentially stored from the 0th column in the direction from the left to the right. Since the image data has already been binarized by the binary converter 2, a "1" in the image buffer corresponds to a black pixel and "0" corresponds to a white pixel in the original image.

Figure 4:
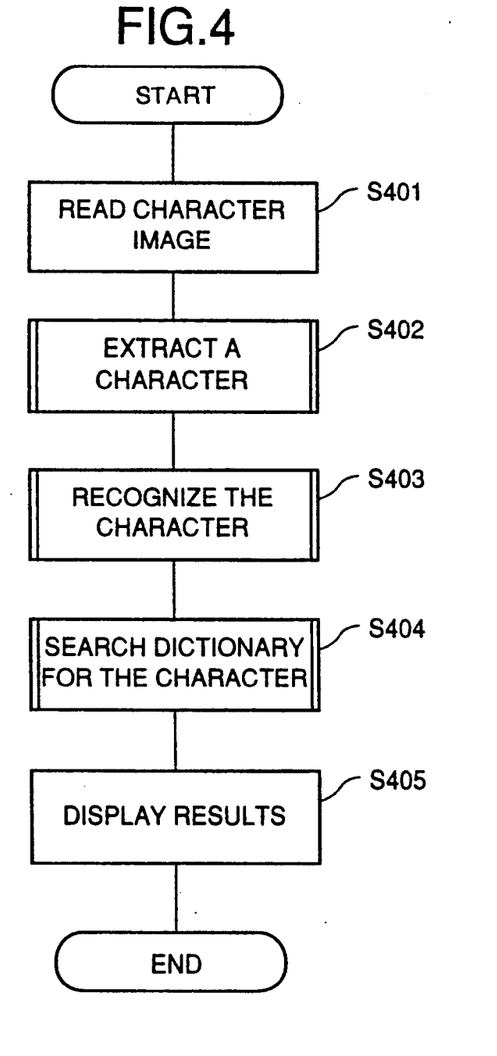
FIG. 4 is a flowchart showing the overall process in the embodiment of FIG. 1.

FIG. 4 is a flowchart showing the overall processing of this embodiment. The processing is executed under the control of the CPU 10 in accordance with programs stored in the ROM 12. A character image is read from the scanner 1 in step S401. In step S402, what is called a character extraction to determine a rectangular region of each character is executed by the CPU 10. In step S403, a checking process is executed for every rectangular region by the CPU 10. In step S404, the CPU 10 searches the dictionary in the ROM 12 by using the character train obtained. In step S405, the translation results are displayed by the LCD 14.

Figure 5:
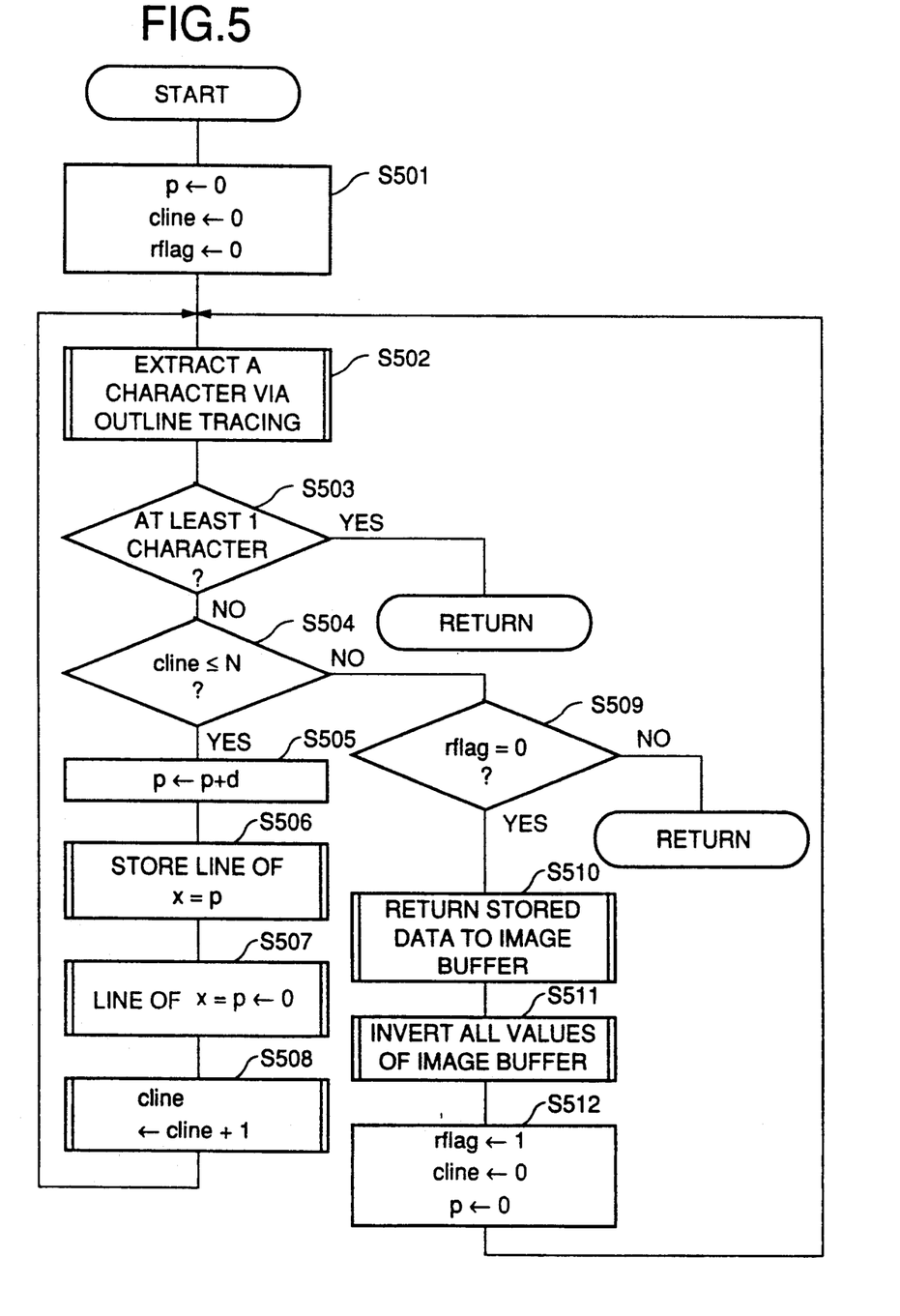
FIG. 5 is a flowchart showing an extracting process.

The extracting process in step S402 will now be described in detail in accordance with a flowchart of FIG. 5. Processes in the flowchart of FIG. 5 are executed under the control of the CPU 10 in accordance with the program stored in the ROM 12.

Figure 6:
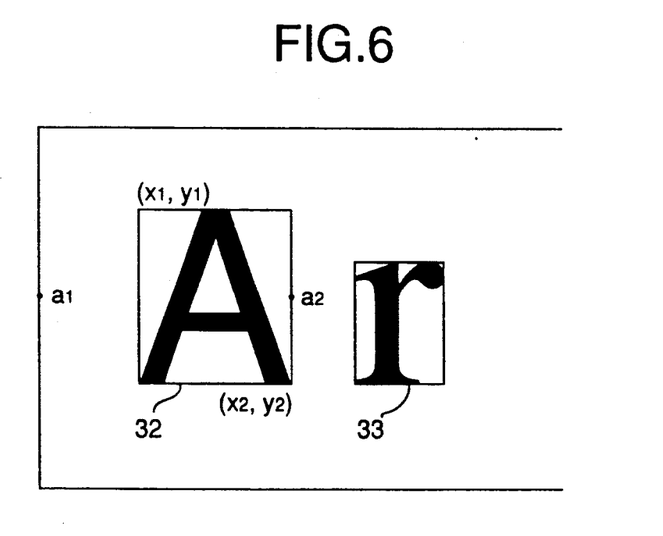
FIG. 6 is a diagram for explaining a character extraction by an outline tracing operation.

In the first step S501, initial values are set into the data in the RAM 11. That is, a value of a variable p to store the x coordinate of the extraction start position, a value of a variable "cline" indicative of the number of columns replaced to the white pixels, and a value of a flag "rflag" indicating whether the whole contents of the image buffers have been inverted, are set to "0". The first column of the image buffers is set to the white pixels in order to perform the extraction by outline tracing. FIG. 6 shows an example of character images stored in the image buffers in the RAM 11. In step S502, a character is extracted by outline tracing beginning from a point $a_1$ at the left edge central position in the image buffer and tracing to the right. The pixels are examined from the point $a_1$ to the right. The outline tracing is executed from a point at a position where the outline tracing first encounters a black pixel. A rectangular region which is given by the minimum value ($x_1$, $y_1$) and the maximum value ($x_2$, $y_2$) of the outline coordinates obtained by the outline tracing is set as a region containing one character. The algorithm of the outline tracing is a well-known technique. In step S502, each time the outline tracing is started, the x coordinate is substituted as a new value of p. After the region of one character is derived, the pixels are examined moving from a position $a_2$ of the coordinates (x=$x_2$, y=($y_1$+$y_2$)/2) to the right in order to extract the next character, and processes similar to those mentioned above are executed.

Figure 8:
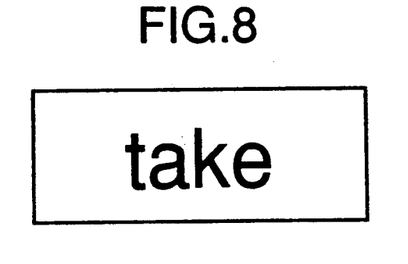
FIG. 8 shows an example of ordinary characters.

In the case of the blank characters as shown in FIG. 7 or 10 or in the case where a ruled line exists before the word to be read as shown in FIG. 11, the outline tracing position reaches the upper/lower or left/right edge of the image buffer during the outline tracing operation and, after that, outline tracing cannot be performed. Even in the case of ordinary characters as shown in FIG. 8, after all the characters are extracted, the outline tracing position finally reaches the right edge of the image buffer, so that a discrimination by the CPU 10 regarding whether the extraction has succeeded or not is executed in step S503. That is, when the outline tracing position reaches an edge after one or more characters are extracted, the outline tracing is returned. When cline reaches the edge without extracting any character, the processing routine advances to step S504. In step S504, when the value of the variable cline in the RAM 11 is equal to or less than a predetermined threshold value N, step S505 follows. If it is larger than N, step S509 follows. In step S505, the value p of the x coordinate at which the outline tracing has been started is increased by only a predetermined value d. In step S506, the values of the line x=p are stored in the line memory buffers set in other addresses different from those of the image buffers in the RAM 11. The line memory buffer can store the data of N lines. In step S507, all of the values of x=p in the image buffers are set to "0". In step S508, the value of cline in the RAM 11 is increased by "1" and after that, the processing routine is returned to step S502 and the extracting process is again executed.

In the case where a ruled line is included as shown in FIG. 7, the processes in steps S505 to S508 for setting all of the values in the image buffers of one line to "0" are executed once so long as the ruled line is a thin line. Those processes generally are repeated only few times even when such a ruled line is a thick line. Due to this, the outline tracing position can get over the ruled line, so that the word subsequent to the ruled line can be accurately extracted.

On the other hand, when cline in the RAM 11 is larger than N in step S504, step S509 follows. When rflag in the RAM 11 is equal to 1, step S510 follows the data of N lines stored in step S506 is returned to the image buffers and the original image data is reconstructed. In step S511, all of the values in the image buffers are inverted. That is, "0" is inverted into "1" and "1" is inverted into "0". By the above process, blank characters as shown in FIG. 7 or 10 are also inverted and can be recognized in a manner similar to ordinary characters.

To store an indication that the inverting process has been executed, "1" is set into rflag in the RAM 11 in step S512. After that, step S502 follows and the extracting process is again started. In step S512, both cline and p in the RAM 11 are reset to "0".

When rflag in the RAM 11 is equal to 1 in step S509, this means that the inverting process has already been performed once. There is no reason to invert again. Therefore, the CPU 10 determines that the input image is an image that cannot be recognized. The processing routine is now finished.

In this embodiment, after the image data is stored in the whole image buffers, the extracting process is started. The extracting process can also be executed in parallel with the transfer of the image data from the scanner. In such a case, when it is assumed that the image data has already been transferred until $x=x_1$ at a certain time point t, it is necessary to wait for the execution of each process in steps S502, S505, and S511 in the flowchart of FIG. 5 so as not to exceed $x=x_p$.

In this embodiment, although the data is transferred from the scanner into the image buffer line by line, the data transfer can instead be performed row by row.

Again, in this embodiment, an English word is read and the corresponding word in Japanese is displayed. However, the particular language to be read is not limited so long as it is one in which spaces exist between consecutive characters (characters are separately written).

The invention also doesn't depend on the particular recognition algorithm used and word extracting algorithm but is also effectively applied with other algorithms.

What is claimed:

1. An image processing method comprising the steps of:
   inputting an image;
   storing a start point;
   searching for black pixels, starting from the stored starting point, and tracing an outline of a pattern including black pixels located in the searching;
   discriminating whether a whole pattern has been extracted by a tracing operation in said searching and tracing step;
   moving the start point if it is discriminated in said discriminating step that no whole pattern has been extracted;
   repeating said searching and tracing step starting from the moved start point; and
   if it is discriminated in said discriminating step that a whole pattern has been extracted, outputting the extracted pattern.

2. A method according to claim 1, wherein said tracing step and said moving step are repeated until character information can be extracted in said second tracing step.

3. A method according to claim 1, wherein, when said tracing step and said moving step are repeated, the number of movement times of the start point is counted, and when the count value exceeds a predetermined value, the image information is inverted.

4. A method according to claim 1, wherein the input image comprises one line of image including a whole pattern.

5. A method according to claim 1, wherein, in said inputting step, the image is input with a hand scanner.

6. A method according to claim 1, further comprising the step of recognizing the output extracted pattern and outputting the recognized pattern as a code.

7. A method according to claim 6, further comprising the step of displaying a pattern corresponding to the output code.

8. A method according to claim 7, wherein, in said display step, the pattern is displayed using a LCD display.

9. An image processing apparatus, comprising:
   means for inputting an image;
   means for storing a start point;
   means for searching for black pixels, starting from the stored starting point and tracing an outline of a pattern including black pixels located in the searching;
   means for discriminating whether a whole pattern has been extracted by a tracing operation performed by said means for searching and tracing;
   means for moving the start point if it is discriminated by said discriminating means that no whole pattern has been extracted;
   means for causing repetition of searching and tracing operation by said means for searching and tracing, starting from the moved start point; and
   means for outputting an extracted pattern if it is discriminated by said discriminating means that a whole pattern has been extracted.

10. An apparatus according to claim 9, wherein said control means controls said output tracing means and said start point setting means to repeat the tracing of the outline and the movement of the start point until the character information can be extracted.

11. An apparatus according to claim 9, further comprising:
   counting means for counting the number of movement times of the start point when the tracing of the outline by said outline tracing means and the movement of the start point by said setting means are repeated; and
   inverting means for inverting the image information when said counting means counts a predetermined number of movement times.

12. An apparatus according to claim 9, wherein the input image comprises one line of image including a whole pattern.

13. An apparatus according to claim 9, wherein said input means comprises a manual scanner.

14. An apparatus according to claim 9, further comprising means for recognizing the output pattern and for outputting the recognized pattern as a code.

15. An apparatus according to claim 14, further comprising means for displaying a pattern corresponding to the output code.

16. An apparatus according to claim 15, wherein said display means comprises a LCD display device.

17. An image processing method comprising the steps of:
   inputting an image;
   storing a start point;
   searching for black pixels, starting from the stored starting point, and tracing an outline of a pattern including black pixels located by the searching;
   determining a size of the pattern from the traced outline;
   moving the start point in accordance with the determined size; and
   repeating said searching and tracing step starting from the moved start point.

18. A method according to claim 17, wherein the input image comprises one line of image including a whole pattern.

19. A method according to claim 17, wherein, in said input step, the image is input using a manual scanner.

20. A method according to claim 17, further comprising the step of extracting a whole pattern from the traced outline and outputting the extracted pattern.

21. A method according to claim 20, further comprising the step of recognizing the output pattern and outputting the recognized pattern as a code.

22. A method according to claim 21, further comprising the step of displaying a pattern corresponding to the output code.

23. A method according to claim 22, wherein, in said display step, the pattern is displayed using an LCD display.

24. An image processing apparatus, comprising:
   means for inputting an image;
   means for storing a start point;
   means for searching for black pixels, starting from the stored starting point, and tracing an outline of a pattern including black pixels located in the searching;
   means for determining a size of the pattern from the traced outline;
   means for moving the start point in accordance with the determined size; and
   means for causing repetition of searching and tracing operation by said means for searching and tracing, starting from the moved start point.

25. An apparatus according to claim 24, wherein the input image comprises one line of image including a whole pattern.

26. An apparatus according to claim 24, wherein said inputting means comprises a manual scanner.

27. An apparatus according to claim 24, further comprising means for extracting a whole pattern from the traced outline and outputting the extracted pattern.

28. An apparatus according to claim 27, further comprising means for recognizing the output pattern and outputting the recognized pattern as a code.

29. An apparatus according to claim 28, further comprising means for displaying a pattern corresponding to the output code.

30. An apparatus according to claim 29, wherein said display means displays the pattern using an LCD display.

* * * * *